United States Patent [19]

Criswell

[11] Patent Number: 4,989,172

[45] Date of Patent: Jan. 29, 1991

[54] APPARATUS AND METHOD FOR CHECKING START SIGNALS

[75] Inventor: Peter B. Criswell, Bethel, Minn.

[73] Assignee: Unisys Coporation, Blue Bell, Pa.

[21] Appl. No.: 475,610

[22] Filed: Feb. 6, 1990

[51] Int. Cl.[5] .............................................. G06F 11/00
[52] U.S. Cl. ........................................ 364/737; 371/60
[58] Field of Search ... 364/736, 737, 740, 200 MS File, 364/900 MS File; 371/67.1, 68.3, 60, 16.1, 16.3

[56] References Cited

U.S. PATENT DOCUMENTS

| | | | |
|---|---|---|---|
| 4,251,885 | 2/1981 | Dodt et al. | 371/60 |
| 4,314,350 | 2/1982 | Toy | 364/740 |
| 4,924,467 | 5/1990 | Criswell | 364/740 |

Primary Examiner—Dale M. Shaw
Assistant Examiner—Long T. Nguyen
Attorney, Agent, or Firm—John W. Sowell; Glenn W. Bowen; Mark T. Starr

[57] ABSTRACT

Apparatus for checking and detecting erroneous start signals is provided in the arithmetic section of a high speed instruction processor and may be embodied in other types of processors. The novel logic circuits include circuits for detecting an attempted start signal while a previous instruction is still in process; logic circuits for detecting when an even arithmetic sequence and an odd arithmetic sequence other than the first sequence are being concurrently processed; and logic circuits for detecting when an AR start instruction is being attempted during a wrong minor cycle.

10 Claims, 5 Drawing Sheets

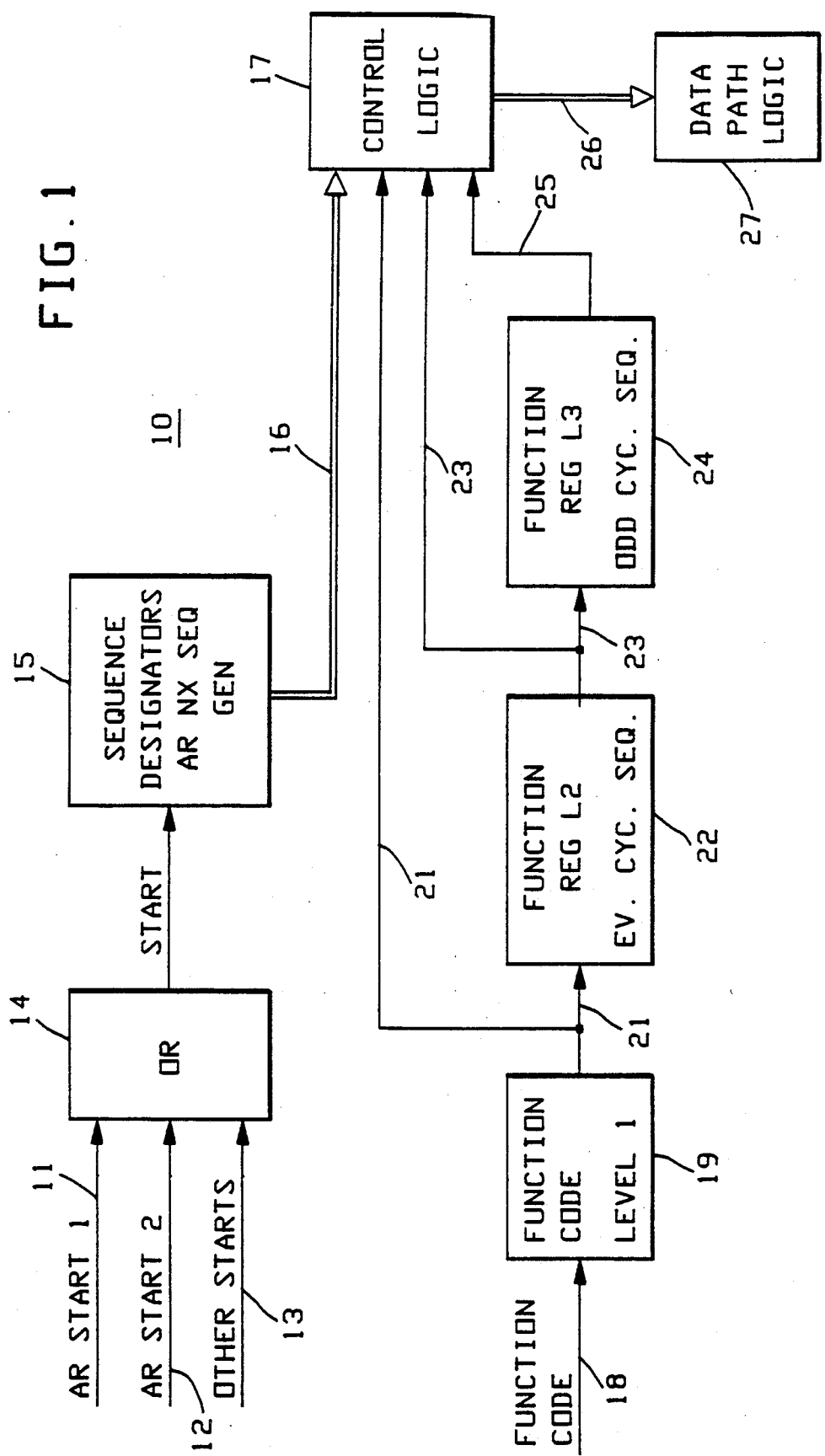

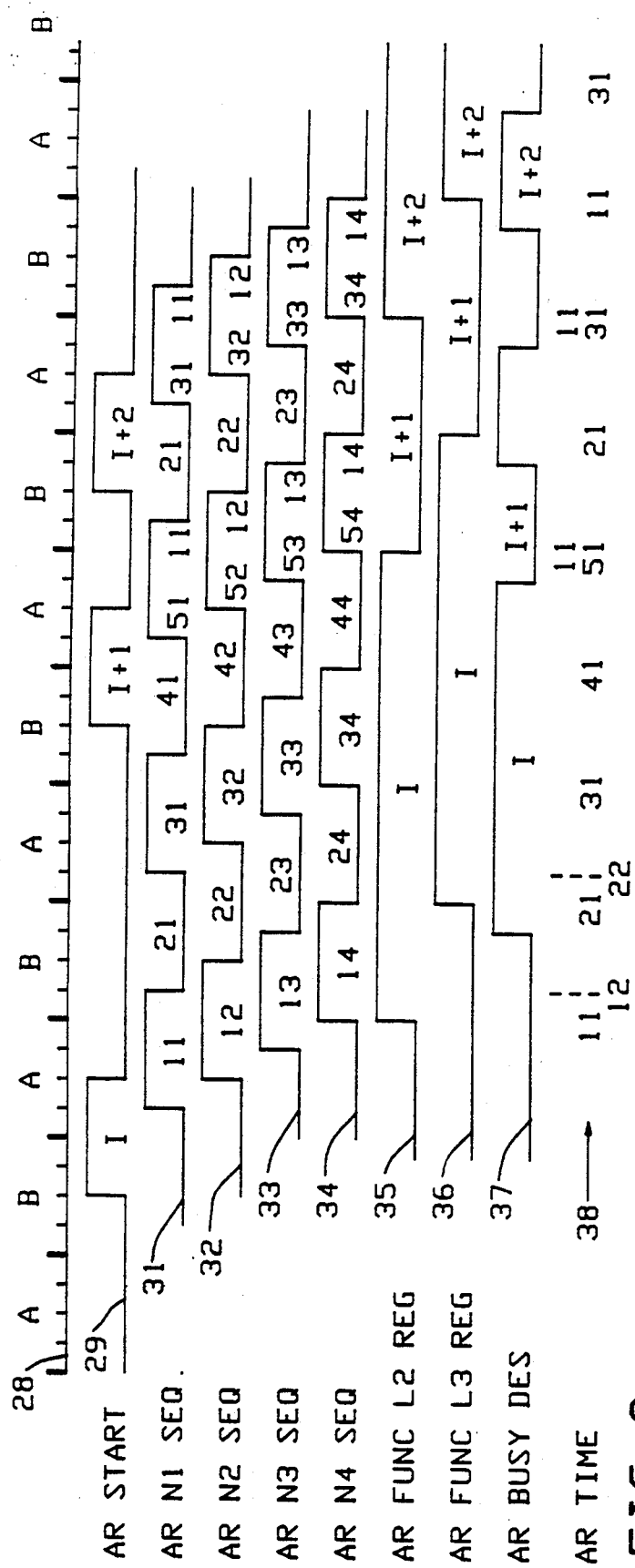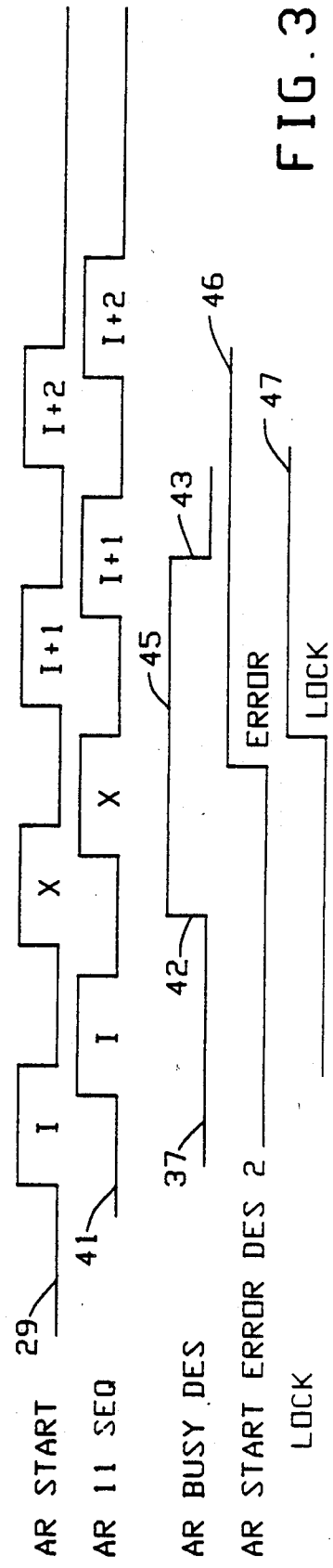

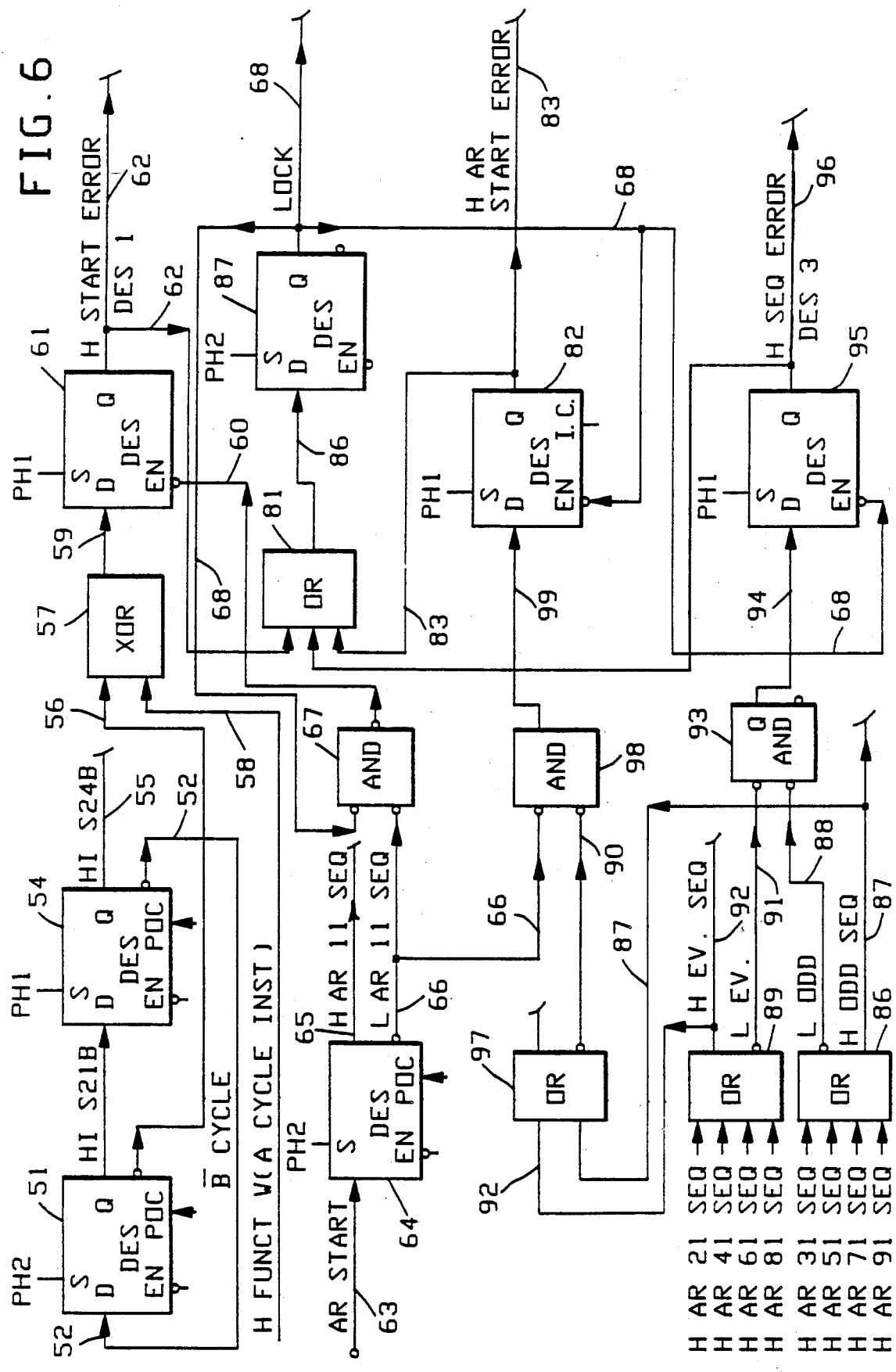

APPARATUS AND METHOD FOR CHECKING START SIGNALS

BACKGROUND OF THE INVENTION

1. Field of the Invention

The present invention relates to error checking circuits. More particularly, the present invention relates to an apparatus and method for detecting extraneous start signals which occur within an Instruction Processor (IP) and whose purpose is to start the operation and sequencing controls for a subsection of the processor (e.g. the arithmetic, AR, section of the IP). The present invention in particular can be used in subsections capable of executing overlapping instructions.

2. Description of the Art

Heretofore, complex high speed computing systems have employed numerous checking circuits built into the systems which are directed to automatically correcting bit errors as well as isolating and identifying the logic boards and components which produce these errors to lower the down time and to enable maintenance crews to properly and promptly service the part of the system which produces the errors. Such checking apparatus has included maintenance controllers which log or accumulate information concerning errors that are detected which enable the maintenance personnel to repair the equipment producing the errors.

Instruction Processors (IPs) comprise a critical portion or component of high speed computing systems. IPs are in turn comprised of numerous sections whose timing and response are critically orchestrated by the main control section of the IP. However, some sections of the IP such as the arithmetic section also require additional signals from other sections of the processor as part of the numerous inputs necessary to complete an instruction. After the numerous inputs which are necessary to complete an instruction are assimilated, a start signal is initiated to begin the execution of an instruction. Since the different IP sections embrace numerous logic components, the failure of any logic component can result in raising an erroneous start signal in the arithmetic section of the IP. False or erroneous start signals can initiate the processing of two arithmetic operations in the arithmetic section at the same time which may be manifest in several different ways as follows:

a. The data being processed may become corrupt and create errors which are detected in the arithmetic section registers by through-checking logic such as parity checkers.

b. The data being processed becomes corrupt in the arithmetic section in a manner which does not permit the detection in the arithmetic section registers, thus, produces downstream errors.

c. The erroneous start signals may result in an IP "hang" condition where the false active start condition creates a continuous stuck-at-active-start condition which blocks valid subsequent start signals or a blocking condition may be left active when the controlling sequence designators fail to clear the block due to the false start condition.

In item a above even though the error has been detected in the arithmetic section it creates a troublesome and difficult condition for a repair person or customer engineer because he is prone to believe that the failure is within the arithmetic section where it was detected. This can result in wasted repair time swapping arithmetic PC boards in attempting to fix the problem when the error is not in the arithmetic section.

The arithmetic section is started by one of the arithmetic start signals (AR start) which are input data signals from which the first of a series of sequence designators (SEQ DES) are generated which control all the gating within the arithmetic section. Nearly all further control sequences are contained within the arithmetic section and are based upon the functional coded signals which enable the control logic and select the data path logic. The erroneous selection of data paths and timing control will corrupt the data being processed in the arithmetic section and may or may not generate detectable errors in the arithmetic section. When these outside start signals are in error they usually produce detectable errors in the arithmetic section but most assuredly create some problem down stream from the arithmetic section but not at the components, logic circuits and active gates where the error was instigated.

Accordingly, it would be extremely desirable to provide circuits and a method for detecting extraneous start signals in the arithmetic section to prevent otherwise undetectable data corruption. It is further desirable to provide logic circuits for detecting false starts and data corruption which occurs in the arithmetic section.

SUMMARY OF THE INVENTION

It is a principal object of the present invention to provide logic error detecting circuits for detecting false start signals in a high speed computing system.

It is another principal object of the present invention to provide logic circuits for detecting the case when the arithmetic section is attempting to start on the wrong minor cycle.

It is another principal object of the present invention to provide logic circuits for detecting the case when an illegal combination of sequence designators are attempting to carry out an instruction.

It is another principal object of the present invention to provide logic circuits for detecting illegal combinations of designators wherein odd cycle designators are coincident with even cycle designators.

It is another principal object of the present invention to provide logic circuits for detecting extraneous start signals having sequence designators which improperly overlap sequences of a previous uncompleted instruction.

It is another object of the present invention to provide a plurality of sequence error designators for detecting arithmetical supplemental errors which are adapted to be integrated into large scale integration (LSI) arithmetic sequence circuits.

It is a general object of the present invention to provide individual sequence error checking circuits for the most common type of false starting errors.

According to these and other objects of the present invention there are provided logic circuits for checking the presence of start errors in the arithmetic section of a high speed instruction processor (IP) which include circuits for detecting the coincidence of even arithmetic sequence designators and odd arithmetic sequence designators concurrently or the coincidence of illegal combinations of designators and start signals which are initiated on a wrong minor cycle.

BRIEF DESCRIPTION OF THE DRAWINGS

FIG. 1 is a schematic block diagram of an arithmetic section (AR) of an instruction processor (IP) showing three levels or ranks of decode logic circuitry;

FIG. 2 is a wave form and timing diagram for a preferred embodiment arithmetic section of a high speed instruction processor;

FIG. 3 is a wave form diagram similar to FIG. 2 showing the detection of an extraneous start signal and the generation of an error and lock signal;

FIG. 6 is a schematic block diagram of the preferred embodiment logic circuits for detecting false start signals in a high speed IP having no overlap instructions.

DESCRIPTION OF THE PREFERRED EMBODIMENT

Figure 4:
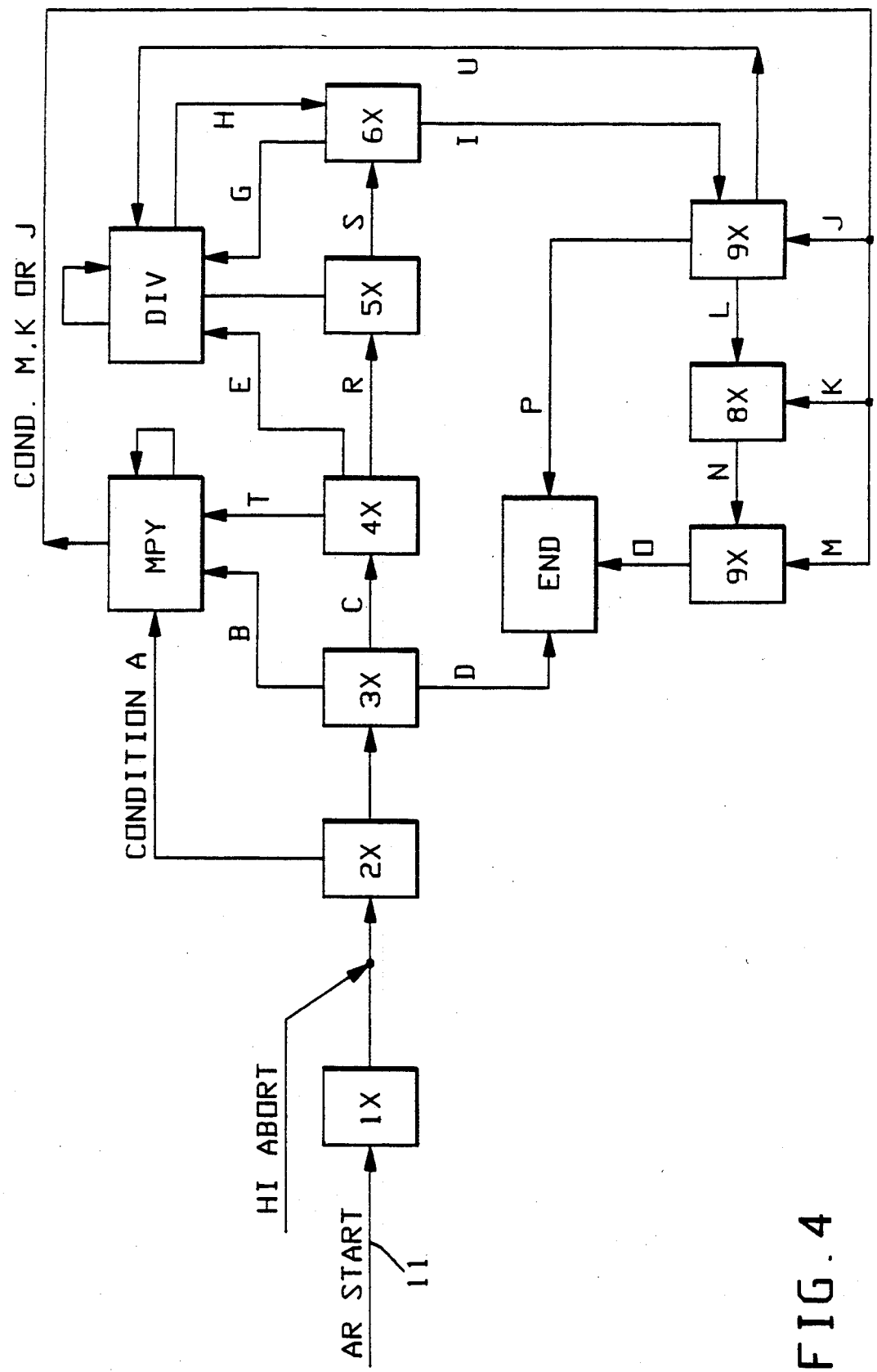
FIG. 4 is a state or block diagram showing sequence conditions and timing of instructions.

Refer now to FIG. 1 showing a schematic block diagram of an arithmetic section (AR) of an instruction processor (IP) showing three levels or ranks of decode logic circuitry. The AR section 10 is shown functionally having a plurality of start input signal lines 11, 12 and 13 which are labelled Start 1, Start 2 and other Starts respectively. Any input on lines 11 to 13 is applied to logic OR block 14 and will produce the start signal shown as an input to sequence generator 15. The start signal will be applied to a latch (not shown) called the AR 11 SEQ latch in the sequence generator 15. Sequence generator 15 produces AR NX SEQ signals on output bus 16 which are applied to the control logic 17 of the arithmetic section 10 of the instruction processor (not shown). Instructions to the AR section 10 are presented on line 18 as function codes where they are decoded in three decoding levels, two of which involve function registers (L-2 to L-3). Function decode level 19 generates the early L-1 function codes on line 21 for gating and controlling AR timing at AR times 11 to 13 which usually occur during a B cycle. The function decode level registers 22 generate the L-2 function codes on line 23 for gating and controlling AR even cycle times such as 23, 61 or 84 and the multiply (MPY) and divide (DIV) cycle times. Function decode level registers 24 generate the L-3 function codes on line 25 for gating and controlling all odd sequence times which occur after 14 time. Control logic 17 generates control signals on control bus 26 which activates the gates, latches and functional elements which comprise the data path logic 27.

FIG. 1 illustrates the fact that AR section problems are related to gating of the data path logic in the AR 10 which can be the cause of start errors. In the preferred embodiment AR 10, there are nine main sequences or states plus the multiply and divide sequences. Gating which occurs on any odd sequence time is controlled by the L-3 function register 24 which is always gated at AR 21 time as will be explained hereinafter. When an extraneous start signal is generated at lines 11 to 13 it is sometimes accompanied by a function code signal at line 18. If the AR 10 is still busy with a previous instruction, the designator signals which occur on bus 16 will attempt to regate the control and timing signals on lines 21, 23 and 25. When the values differ from the original decoded signals and/or the proper designator sequence signals, the control logic 17 and data path logic 27 corrupts the instruction in process.

When sequences which should not run concurrently are attempted, the function registers 19, 22 and 24 may be changing at the time the first instruction is using the timing signals. A race condition can result from changing function conditions during an instruction in process. Further, if an odd sequence runs in parallel with an even sequence, there are actually two separate instructions employing the output of the function registers 22 and 24 for the same cycle, thus, creating improper gating in the control logic 17 and data path logic 27. Further, changing the function registers 22 and 24 in the middle of an instruction could result in not gating some of the control logic 17, such as a busy indicator which restarts other sections of the control logic at the end of an arithmetic operation, thus creating a hang condition.

Even if the extraneous start signal is not issued while the arithmetic section is busy with another instruction, it can result in a hang condition or corrupt the data if it is started on the wrong minor cycle. As will be explained hereinafter, each instruction type must be started on a correct minor cycle to properly process an instruction. When the AR section is started on a wrong minor cycle it will be out of synchronization with the rest of the instruction processor and can attempt to communicate with the other sections of the instruction processor at the wrong time.

Refer now to FIG. 2 showing a wave form and timing diagram for a preferred embodiment arithmetic section 10. Before explaining, the wave forms of FIG. 2 certain rules have been adopted for the preferred embodiment of the present invention. The AR start signals are applied to latches identified as the AR 11 sequence latch which is the first of a series of sequence designators which control all gating within the AR section. Once the AR 11 sequence latch is set, all further control for the sequence being run (except for abort conditions) is contained within the AR section 10. The sequence being run is based upon the code functions explained herein before with reference to FIG. 1. Each sequence designator has a name of the form AR XY SEQ where X refers to the cycle and Y refers to the phase within the cycle. There are nine main sequences plus multiply and divide. The sequence designators are so named that they indicate the time they nominally control an operation and this time occurs three phases after the sequence designators are gated. Thus, it will be understood that AR 82 sequence will control AR 82 time. The sequences are run according to the following rules:

a. Each instruction must run an odd number of sequences to properly END.

b. The last functional sequence that is run must be a 3X, 5X, 7X or 9X sequence.

c. The first sequence, 1X, or any instruction may overlap (be coincident with) the last sequence of the previous instruction without creating an error.

d. If the N1 sequence runs then the N2, N3 and N4 sequences occurring at subsequent phases of the same cycle will also run.

e. Gating which occurs from time 11 to time 13 will be controlled by the decode on output line 21 from the level 1 decoder 19; gating which occurs at 14 time during even cycles is controlled by output line 23 from function register L-2 which is always loaded at AR 11 time; and gating which occurs during any odd cycle sequence is controlled by the AR function L-3 registers which are always gated at AR 21 time.

In FIG. 2 a chat of scale 28 indicates the time of occurrence of the two minor cycles A and B and are shown having four discrete phase subdivisions. The AR start signal wave form 29 is shown having three different instruction times. Instruction I is a five cycle instruction that terminates during the start of the I+1 instruction which is a three cycle instruction. The I+1 instruction terminates during the start of the I+2 instruction which is also a three cycle instruction. Wave forms 31 to 34 illustrate the AR N1 to AR N4 timing sequences. AR N1 becomes active three phases after instruction I goes high AR sequences N2 to N4 sequentially become active one phase after the previous AR sequence. Each of the AR sequences for the five cycle instruction I continue until the AR sequence N1 to N4 becomes the 51 to 54 sequence. During the 51 to 54, AR sequence the I+1 instruction has its first cycle of its AR sequence shown overlapping and concurrent with the fifth cycle of the I instruction. In similar manner the third and last cycle of the I+1 instruction is shown overlapping and concurrent with the first cycle of the I+2 instruction and is designated by the AR sequences 31,11 to 34,14 as shown. The AR function L-2 register 22 gates the information for the I instruction concurrent with the last AR 14 sequence and remains active for four minor cycles as shown at wave form 35. The AR function L-2 register 22 contains the information is low for the I+1 instruction for two cycles going high starting concurrently with the AR 14 sequence shown on wave form 34. The AR function L-2 register becomes active for the I+2 instruction concurrent with the AR 14 sequence and remains active for two major cycles. Similarly wave form 36 for the output of the L-3 function register occurs one cycle after the wave form 35 which was loaded at 11 time. The wave form 36 is gated at 21 time. Wave form 37 represents the AR busy designator and becomes active three phases after the instruction I etc. and terminates one phase before the instruction I etc. Thus, the active portion of wave form 37 for the different instructions shown in wave form 37 is one minor cycle shorter than the wave form 35. Scale 38 represents the arithmetic section (AR) time. Between the time 11 and the time 21 there occurs times 12, 13 and 14 occurring simultaneously with the phase times on scale 28. The pulses or AR times may be narrow pulses for gating purposes or may endure for the major portion of the phase centered about the AR time.

Refer now to FIG. 3 which is employed to illustrate the timing of the detection of an erroneous start signal. The AR start wave form 29 is shown having the same original five cycle instruction I followed by an erroneous AR start signal X shown as pulse 39. Wave form 41 illustrates the AR 11 sequence wave forms which are generated as a result of the four instructions shown on wave form 29. The AR busy designator 37 becomes active at phase 3 of a B minor cycle as shown at point 42 for the instruction I and would under ordinary conditions become inactive at point 43. However, the AR 11 sequence for the erroneous instruction X shown at wave form 44 occurs concurrently with the AR busy signal 45 and creates an AR start error designator DES 2 error signal shown as wave form 46. One phase later the error signal 46 generates a lock signal 47 as will be described in more detail hereinafter.

Refer now to FIG. 4 showing a state diagram in block diagram form for sequence conditions and timing of instructions. The AR start signal previously described on lines 11 to 13 activates AR NX sequence designators. Each of the blocks represents the staging of the four sequence designators AR N1 sequence to AR N4 sequence starting at phase 1 of the NX sequence. The letter designations A to U represent the state (function or condition) combination which results in the next sequence being started. The conditions D, 0, P and Q always result in the termination or END of a function or condition. A feature of the present invention is that the AR sequencing can be aborted by the main control section 17 by blocking the AR 21 sequence which occurs at the input to the 2X block at phase 2 of 1X.

Figure 5:
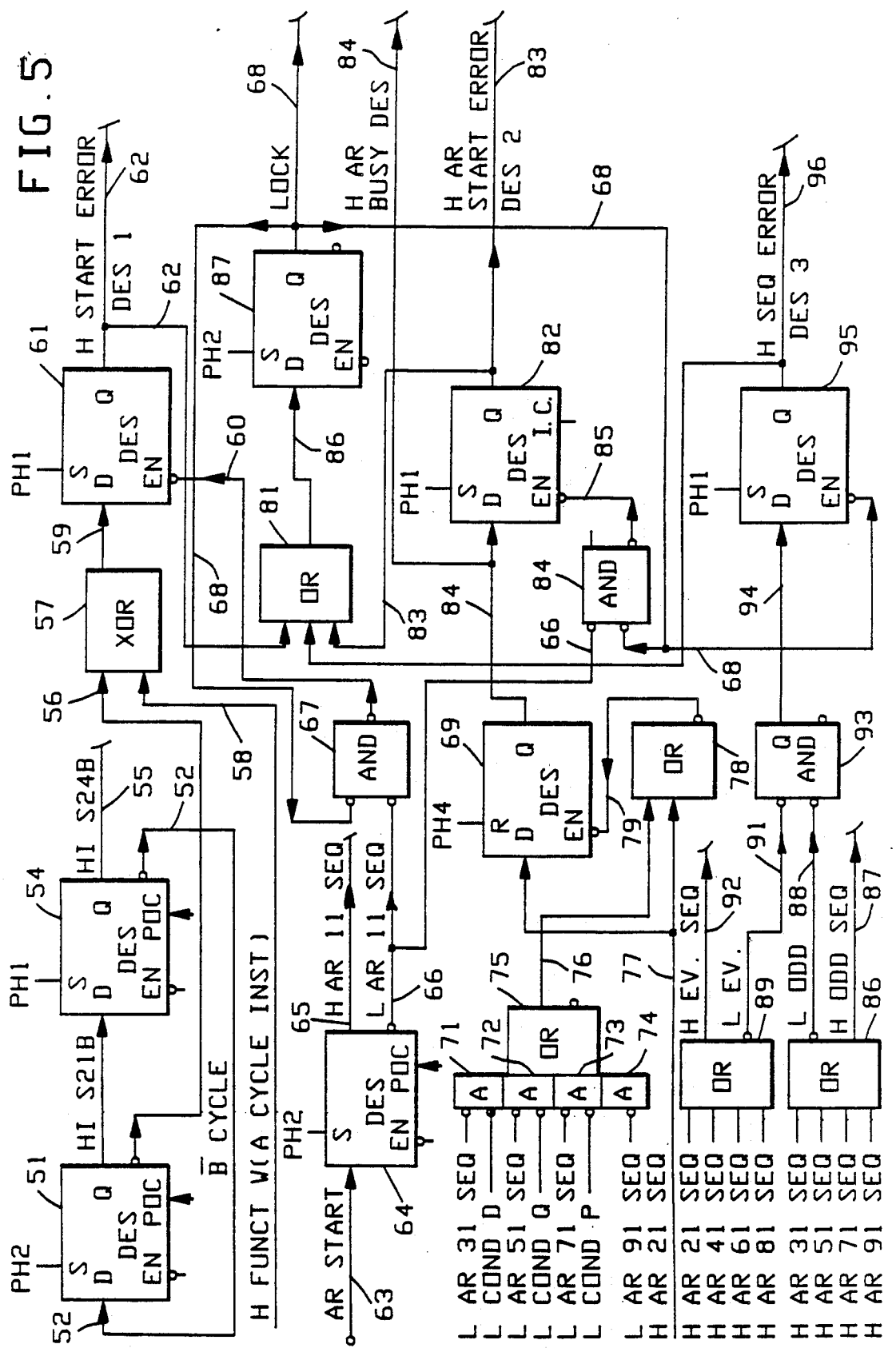
FIG. 5 is a schematic block diagram of the preferred embodiment logic circuits employed for detecting false start signals in a high speed IP having provision for overlapping instructions.

Refer now to FIG. 5 showing the preferred embodiment logic circuits for detecting false start signal in an instruction processor of the type having provision for overlapping instruction. Designator 51 is shown having a phase 2 cycle A strobe input and a low enable input. When line 52 at the data input goes high a high, sync 21B signal is produced on output line 53 to the data input of designator 54 which is strobed three phases after the phase two strobe input. Designator 54 is strobed at phase 1 of a cycle B and produces a high sync 24B signal on line 55 and the complement thereof on line 52 which is indicative of NOT cycle B. Phase 1 of cycle B is coincident with AR 1 time as shown in FIG. 2. Sequence 21B indicates that line 53 is high at phase 1 of cycle B and produces the high sequence 24B signal on line 55. NOT sequence 24B is indicative of cycle A or NOT cycle B.

The negative output from designator 51 on line 56 is applied to the input of exclusive OR gate 57 along with a high function W input which is indicative of the instructions which must be started during the A cycle on line 58. If a high output occurs on line 59 at 11 time it will initiate a high start error signal on line 62 from designator 61.

Thus, the start error designator 1 signal on line 62 detects the case when the arithmetic section is started on the wrong minor cycle. As will be explained hereinafter this condition will also create a busy signal. Latches 51 and 54 are initially cleared by the power on clear signal and are alternately set and cleared on A and B minor cycles, thus, indicating the active A or B cycle of the arithmetic section upon start of any instruction. The function W signal on line 58 is the decode of all instructions which start on an A cycle and is generated in the function decode level 1 logic 19. Upon the receipt of the AR start signal on line 63, the AR 11 SEQ designator will set which will result in the start error designator (DES 1) 61 being strobed. When the strobing at 11 time is coincident with a B cycle condition (i.e. DES 51 is set), and the function W signal on line 58 is high, then the output of the exclusive OR gate 59 will be high and the start error designator (DES 1) 61 will be set indicating an error condition was detected. Similarly, an error will be detected if the function W signal on line 58 is low at 11 time and designator 51 is clear.

The AR start signal always arises at phase 2 of cycle B as explained with reference to FIG. 2 for all instructions. Designator 64 receives the start signal and is strobed at phase 2 while low enabled and produces the active AR 1 sequences on line 65 and the complement thereof on line 66 which is applied to AND gate 67 along with a NOT lock signal on line 68 to be explained hereinafter. The output of AND gate 67 on line 60 is the low enable signal to designator 61 which enables the generation of the start error signal on line 62.

In addition to the start error designation signal DES 1, provision is made to detect the case when the arithmetic section has been started and any sequence other than the last cycle of a previous instruction is still active, thus, indicating an improper overlapping of instructions. As explained herein before with reference to FIG. 4, the preferred embodiment permits the overlap or beginning of a second instruction with the last cycle of a previous instruction thus, the strobing or examination for an AR busy designation cannot be made until 21 time because it is possible to abort and block all sequences up until this time. Accordingly, the setting of the AR busy designator 69 will be shown to be controlled by the AR 21 sequence rather than the AR 14 sequence designator because the preferred embodiment arithmetic section would permit a false error to be detected when starting or restarting by the next instruction. Once the AR 21 sequence is started, the arithmetic sequence cannot be aborted unless all sequences are blocked and an interrupt clear is issued to all elements of the arithmetic section to totally reinitialize the AR section. As explained hereinbefore with reference to FIG. 4 showing the preferred embodiment arithmetic sequencing, all valid instruction sequences must end at 3X, 5X, 7X or 9X depending on the instruction. The four letter conditions represents the function or combination which results in the last sequence before the END sequence. Accordingly, AND gates 71 to 74 monitor the presence of these four last sequence conditions and apply them as an input to OR gate 75 to provide a signal on line 76 indicative of the last sequence or overlap sequence of a proper instruction along with a high AR 21 sequence which occurs for any new start instruction after the last time for aborting the instruction. The signals on lines 76 and 77 are applied to OR gate 78 to provide a low enable output signal on line 79 to the AR busy designator 69. The AR busy designator 69 is reset on the phase 4 preceding the last cycle of the previous instruction which for the example indicated must occur during the 3X, 5X, 7X or 9X sequences. At AR 11 time, which occurs three phases after the AR 11 sequence designator, the AR start error designator 82 is strobed by a phase 1 strobe pulse and will set indicating an AR start error designation DES 2 error on line 83 if the AR busy designation signal is still set and active on line 84. Thus, the start error condition DES 2 on line 83 detects the case when the arithmetic section was started while any sequence other than the last cycle of the previous instruction was still active. The lock signal on line 68 and the AR 11 sequence signal on line 66 are shown being applied to AND gate 84 as low active signals. The low active output of AND gate 84 in response to these two low active signals on line 85 is employed to enable the AR start error designator 82. It will be noted that if the start error designator 1 condition exists on line 62, it also exists at the output of OR gate 81 on line 86 as an input to the lock latch 87 which is strobed at phase 2 time to produce a lock signal on line 68. The high lock signal on line 68 is indicative that a start error condition already exists and the high lock signal on line 68 blocks the low enable output signal on line 85 from AND gate 84 and locks out the generation of the AR start error signal on line 83. The purpose of the lock condition is to prevent the duplication of start error signals and the first start error signal which is raised will create the lock signal for the subsequent start error signals. Accordingly, the start error signal on line 83 is shown as one of the three inputs to OR gate 81 which can create the lock condition.

The two start error detecting latches 61 and 82 are augmented by logic which is intended to detect illegal combinations of sequence designators within the AR section. Since the lock designator 87 will allow only the first error to be detected, the presence of the internal sequence checking logic will enhance better isolation of a fault internal to the sequence logic. This internal checking logic may have several forms in detecting illegal combinations of sequences. Such structure could be a parity or 1 of N detector. For example, latch 95 is shown which detects a sequence error which occurs if an odd sequence is attempting to be run at the same time that an even sequence is being run. This set of error conditions are sensed by a applying all of the odd sequences, except the 11 sequence which is employed as a gating signal, to the input of OR gate 86 to produce a high odd sequence signal on line 87 and a low active odd sequence signal on line 88. Similarly, all of the even sequence signals are applied to OR gate 89 to produce a low even sequence signal on line 91 and a high even sequence signal on line 92. The low active signals on lines 88 and 91 are applied to AND gate 93 which acts as a comparator and produces a high output signal on line 94 if an even sequence is occurring concurrently with an odd sequence indicating that a sequence error is in progress. The signal on line 94 is applied to the sequence error designator 95 which is strobed during phase 1 to produce a high sequence error signal designation DES 3 signal on line 96 when an even sequence is attempting to run concurrently with an odd sequence. As described hereinbefore the lock signal from the lock latch or designator 87 on line 68 is applied to the enable input of the sequence error designator 95 to inhibit or prevent the high sequence error signal on line 96 from occurring if the designator 61 or 82 have already raised a start error signal which results in a high inhibit lock signal on line 68.

Refer now to FIG. 6 showing a schematic block diagram of the preferred embodiment logic circuits for detecting false start signals in a high speed instruction processor of the type which has no overlap instructions. It will be noted that the major portions of FIG. 6 are identical to the logic circuitry of FIG. 5. Accordingly, the elements and logic circuitry numbered the same as the elements of FIG. 5 operate in the identical manner as described hereinbefore with reference to FIG. 5 and do not require additional description. The circuitry formerly associated with the AR busy designator 69 and its input and output circuits have been eliminated because there is no overlap instruction. The start error designator DES 1 on line 62 is the same as in the overlap case. The high sequence error designator DES 3 is the same as in the overlap case of FIG. 5. However, there is no requirement to test whether the start error designator DES 2 is attempting to start a new instruction during the last cycle of the previous instruction. Accordingly, the high even sequence signals on line 92 and the high odd sequence signals on line 87 may be applied directly to OR gate 97 to produce a low active any sequence signal during phase 1 of any cycle on line 90 which is applied to AND gate 98 along with the low active AR 11 sequence on line 66 indicative of an instruction and process. AND gate 98 thus acts as a comparator and generates a high output signal on line 99 in the event that two instructions are attempting to be processed concurrently in the AR section. Designator 82 receives the high active data input signal on line 99 and is strobed at phase 1 to produce the high active AR start error designator DES 2 signal on line 83 if a second instruction is attempting to be started while a previous instruction is still in progress. The lock inhibit signal on line 68 is applied to the low active enable terminal of designator 82 and if high, indicating that one of the other error signals has already been raised, inhibits the output from designator 82 on line 83 as explained hereinbefore.

Having explained a preferred embodiment of the present invention and a modification thereof, it will be appreciated that start error signals which may be erroneously raised as input signals to the arithmetic section are immediately detected and signals raised indicating where the error originated so that proper maintenance of circuit boards other than the AR section may be serviced or replaced. It will now be appreciated that the ability to detect three different types of start errors in the arithmetic section and to log such errors in the maintenance controller and/or raise an unconditional interrupt clear signal so as to block and suppress the generation of false information from the instruction processor is a desirable feature in high speed mainframe computers which has not been properly treated heretofore.

It should be noted that if either start error designator DES 1 or DES 2 (61 or 82) is set in an IP having only one AR section, the fault can be the result of a failure in either the arithmetic section itself (e.g. a fault which causes the busy designator not to be cleared at the end of an instruction) or the result of a failure in the logic which generates the start signals. In such a system the addition of the start error designators has the advantage of indicating to the customer engineer that the start generating logic has to be considered suspect as well as the AR section itself.

In a dual arithmetic section IP, when both AR sections indicate a start error has been detected, the AR sections can be eliminated as a possible source of the error problem.

What is claimed is:

1. Apparatus for detecting start error signals in an instruction processor, said apparatus comprising:
   means for indicating the presence of start signals at a pre-determined time after the initial presence of a valid start signal,
   start error detecting means having a data input and an enable input coupled to said means for indicating the presence of start signals,
   cycle indicating means coupled to the data input said start error detecting means for indicating a minor time cycle of operation of the instruction processor, and
   first strobe timing means coupled to said start error detecting means for raising a start error signal when a start signal is being attempted during an improper minor time cycle of operation.

2. Apparatus as set forth in claim 1 which further includes an AND gate having a lock inhibit signal input and a second input coupled to an output of said means for indicating the presence of start signals,
   the output of said AND gate being coupled to said enable input of said start error detecting means.

3. Apparatus as set forth in claim 2 which further includes lock signal indicating means coupled to said AND gate for generating said lock inhibit signal,
   said lock signal indicating means being coupled through OR gating means to a plurality of start error signals inputs for inhibiting said start error detecting means in the presence of invalid start error signals.

4. Apparatus for detecting start error signals in an instruction processor, comprising:
   gating means,
   a plurality of start signal input lines connected to said gating means,
   first start error detecting means coupled to the output of said gating means for indicating the presence of a start signal during an improper minor time cycle of operation, and
   said gating means being coupled to a plurality of start sequence signals,
   another start error detecting means coupled to the output of said gating means for indicating the presence of a start signal while a previous instruction is still in progress.

5. Apparatus as set forth in claim 4 wherein said another start error detecting means includes logic circuits coupled to said gating means for determining the presence of an odd sequence of instructions concurrently with an even sequence of instructions.

6. Apparatus as set forth in claim 5 wherein said another start error detecting means for indicating the presence of a start signal includes logic circuits for determining the presence of a sequence of instructions simultaneously with the presence of a new start instruction.

7. Apparatus as set forth in claim 6 wherein said another start error detecting means further includes logic circuits means for determining the presence of a start instruction after a 11 sequence of operations and during any sequence other than the last sequence of operations and an end sequence.

8. A method of determining erroneous start instructions which as occur as inputs at an arithmetic means of an instruction processor which may cause improper operation of the arithmetic means, comprising the steps of:
   generating a first cycle signal indicative of both A and B minor cycles,
   generating a second start signal indicative of all instructions which begin with the A minor cycle of operations,
   comparing said first and second signals, and
   generating an error signal when an A minor cycle instruction is operating during a B minor cycle.

9. The method as set forth in claim 8 which further includes steps of:
   comparing the presence of all new start instructions with the presence of a previous instruction in progress, and
   determining if a start instruction is being raised during an improper overlap cycle.

10. The method as set forth in claim 8 which further includes the steps of comparing the presence of all even sequences of instruction with the presence of all sequences of operations being processed, and
    determining if both odd and even sequences of instructions are being processed concurrently which is indicative of an error condition.

* * * * *